United States Patent [19]

Reynolds, Jr.

[11] 4,178,278

[45] Dec. 11, 1979

[54] FRICTION MATERIAL FOR RAILROAD SERVICE

[75] Inventor: Harold J. Reynolds, Jr., Littleton, Colo.

[73] Assignee: Johns-Manville Corporation, Denver, Colo.

[21] Appl. No.: 918,977

[22] Filed: Jun. 26, 1978

Related U.S. Application Data

[63] Continuation-in-part of Ser. No. 882,504, Mar. 1, 1978, abandoned.

[51] Int. Cl.$^2$ ............................ C08K 3/04; C08K 3/08
[52] U.S. Cl. ................................... 260/42.22; 106/36; 260/38
[58] Field of Search .............. 260/38, DIG. 39, 42.22; 106/36

[56] References Cited

U.S. PATENT DOCUMENTS

| | | | |
|---|---|---|---|
| 2,686,140 | 8/1954 | De Gongue | 260/42.22 |
| 2,861,964 | 11/1958 | De Gongue et al. | 260/42.22 |
| 3,152,099 | 10/1964 | De Gongue | 260/38 |
| 3,390,113 | 6/1968 | De Gongue | 260/23.7 |
| 3,673,276 | 6/1972 | Keller et al. | 260/DIG. 39 |
| 3,832,325 | 8/1974 | Eschen | 260/38 |
| 3,835,118 | 9/1974 | Rhee et al. | 260/38 |
| 3,959,194 | 5/1976 | Adelmann | 260/38 |
| 4,051,097 | 9/1977 | Aldrich | 260/38 |

FOREIGN PATENT DOCUMENTS

53572 10/1970 Australia.

OTHER PUBLICATIONS

"A Triple Threat to Quebec Asbestos", *Business Week* Magazine, Aug. 29, 1977, pp. 66F +& 66J.

*Primary Examiner*—Sandra M. Person
*Attorney, Agent, or Firm*—Robert M. Krone; Joseph J. Kelly; James W. McClain

[57] ABSTRACT

A friction material composition is described which is suitable for a wide variety of railroad brake services, particularly AAR (Association of American Railroads) service. In other embodiments the composition may also be used for heavy duty service, such as on locomotives, or as a disc brake material. The composition comprises, in percent by volume:

| | |
|---|---|
| organic component | 30–60% |
| steel fibers | 1–12% |
| carbonaceous component | 5–30% |
| inorganic fillers | 5–35% |
| additives | 1–7% |

The composition may also contain up to 15 volume percent of friction modifiers an/or up to 20 volume percent of cashew nut shell resin particles. In addition, it contains no lead metal or lead compounds and no asbestos fiber.

36 Claims, No Drawings

FRICTION MATERIAL FOR RAILROAD SERVICE

CROSS-REFERENCE TO RELATED APPLICATION

This application is a continuation-in-part of application Ser. No. 882,504, filed Mar. 1, 1978 and now abandoned.

BACKGROUND OF THE INVENTION

The invention herein relates to friction materials suitable for railroad service.

Over the years a number of different types of composition railroad brake shoes have been described in the prior art. These have normally been composed of a rubber and/or resin matrix heavily reinforced with asbestos fiber and containing lead in the form of elemental lead and/or lead oxides as critical components. Typical compositions have been described in U.S. Pat. Nos. 2,686,140; 2,861,964; 3,152,099; 3,390,113; 3,832,325 and 3,959,194. Many of the materials described in the aforementioned patents have enjoyed widespread commercial success as railroad brake shoe compositions under the trademark COBRA. However, environmental and health concerns have led manufacturers to seek friction material compositions which contain neither asbestos fiber nor lead metal or its compounds. Recently, a composition containing little or no lead was disclosed. This was found to be quite advantageous in reducing wheel wear, particularly where softer steels are used. See the aforesaid U.S. Pat. No. 3,959,194. Efforts to eliminate asbestos fiber from the brake shoe compositions have been beset with major difficulties, primarily because the asbestos fiber contributed a unique combination of reinforcement and thermal properties to the compositions. During service application brake shoes undergo significant physical stresses and also experience substantial temperature increases, often reaching peak temperatures in excess of 800° F. Many fibrous materials which might have been expected to be suitable as substitutes for asbestos fiber, such as glass fiber and organic fiber, have been found to be unable to adequately withstand the thermal and physical forces involved in the heavy duty service.

Recently a friction material manufacturer announced the replacement of asbestos fiber in railroad brake shoes with an otherwise undefined "all-metal alloy." It is not disclosed whether such material is in fibrous or other form.

Consequently it would be desirable to have a railroad friction material which contains neither lead nor asbestos.

Further, in the past it has been common practice to provide a different type of friction material composition for different types of railroad service. Conventional AAR (Association of American Railroads) service for standard freight cars constitutes the large majority of the uses of friction materials and therefore many compositions were directed to such end use. However, other uses also require significant quantites of friction materials, such as the heavy duty service (primarily brake shoes for locomotives) and disc brakes (which can be considered to be relatively low pressure, high friction service). The friction materials which have been provided for these other services have been entirely different types of compositions from those designed for the AAR service. Thus friction material manufacturers have had to develop product lines of entirely different types of materials with the attendant high costs of development and fabrication, which added costs were necessarily reflected in the equipment purchase costs of the railroad users.

Consequently, it would be very advantageous to have a basic friction material composition which in different embodiments could be used as an AAR service friction material, a heavy duty service friction material, or a disc brake friction material.

BRIEF SUMMARY OF THE INVENTION

The invention herein is a friction material suitable for railroad use which comprises, in percent by volume:

| organic component | 30–60% |
| steel fibers | 1–12% |
| carbonaceous component | 5–30% |
| inorganic fillers | 5–35% |
| additives | 1–7% |

In other embodiments the composition may also contain up to 15% by volume of friction modifiers and/or up to 20% by volume of cashew nut shell resin particles. The composition contains neither asbestos fiber nor lead metal or lead compounds.

DETAILED DESCRIPTION AND PREFERRED EMBODIMENTS

For the purposes of this invention the various types of railroad service will be categorized on the basis of the contact pressure which is applied across the face of the brake shoe or brake pad during typical brake application. Typical values for disc brake service are application pressures up to about 120 psi (pounds per square inch), for AAR service pressures are up to about 175 psi, and for heavy duty service the application pressures are up to about 280 psi. The numerical limits just stated are not absolute and there is some degree of overlap among the various services. The actual values used will depend on the type of railroad equipment on which the brake is used, whether light or emergency brake application is considered, and similar factors. The distinctions, however, are evident and will be clearly understood by those skilled in the art. In addition, AAR service and heavy duty service commonly employ tread brakes as contrasted to disc brakes. These distinctions also serve to illustrate the versatility of the compositions of this invention in that one broad type of composition can encompass such different service uses with merely variations in the specific embodiments of the composition.

The first and largest component in the present composition is an organic component which consists of rubber or mixtures of rubber and phenolic resin. This component serves as the binder and matrix in which the other components are embedded. The organic component may contain any natural or synthetic rubber, elastomeric material or phenolic resin which may be vulcanized or otherwise cured to form a hard matrix for the remaining components. Of the rubbers preferred are the butyl rubbers, styrene-butadiene rubbers or nitrile rubbers. A number of varieties of the various natural or synthetic rubbers and phenolic resins are readily available and are widely described in the literature. Numerous rubbers are described in the *Vanderbilt Rubber Handbook* published by the R. T. Vanderbilt Company in 1968. Phenolic resins are described in the *Modern*

*Plastics Encyclopedia,* Vol. 47, No. 10 (1970–1971). The organic component will be present in an amount of from 30% to 60% by volume of the composition and preferably from 34% to 53% by volume.

As will be discussed below, there are several different ways to mix and mold the compositions of the present invention and certain embodiments are designed to be more amenable to one type of processing than to another. It is required for all compositions, however, that the rubber in the organic component must constitute at least 20% by volume of the total composition (i.e. at least 33% to 67% of the organic component). Compositions in which the rubber is as low as 20 volume percent of the composition are quite suitable for cold mixing and compression molding. However, for use with injection molding and/or hot mixing, such as Banbury mixing, it has been found that the rubber must comprise at least 35 volume percent of the total composition (i.e. 58% to 100% of the organic component). Thus, the organic component may in some embodiments be composed entirely of rubber, although more commonly the organic component will comprise a mixture of rubber and phenolic resin. For hot mix processing the rubber-to-phenolic resin volume ratio must be at least 5.3:1 and preferably at least 10:1 or more.

(All components are listed herein in amounts measured by volume rather than the more common percent by weight, except where noted. This is done because the volume percentage reflects the physical properties of a given shape and size of brake shoe or disc pad, despite variations in the actual chemical composition of the shoe or pad, since in braking service an important factor is the amount of each material which is exposed at the braking surface which is in contact with the brake disc or the wheel tread. It also simplifies the description of the material of the present invention in that it avoids the necessity for recalculation of components to account for varying densities of materials such as the organic component.)

The second component of the composition and one of the key components in the present composition is the steel fiber component. The steel fiber component consists of finely shredded filaments of steel, preferably low carbon mild steel. (A preferred steel has a non-ferrous composition of 0.11 weight percent carbon, 0.73 weight percent manganese, 0.057 weight percent phosphorous and 0.025 weight percent sulfur.) Steel fibers are available in various diameters which are represented by standard grade designations as set forth in Table I below. The terms "lower 5% limit" and "upper 5% limit" indicate respectively that within a specified grade not more than 5% of the fibers will have diameters less than the "lower 5% limit" and not more than 5% of the fibers will have diameters greater than the "upper 5% limit."

TABLE I

| Grade No. | Lower 5% Limit | | Upper 5% Limit | |
|---|---|---|---|---|
| | inch | microns | inch | microns |
| 0 | 0.00025 | 6.35 | 0.006 | 152 |
| 1 | 0.0005 | 12.7 | 0.010 | 254 |
| 2 | 0.001 | 25.4 | 0.014 | 356 |
| 3 | 0.002 | 50.8 | 0.018 | 457 |

Fiber lengths will commonly run from about 1/32 to about 3/16 inch (about 0.8 to 4.8 mm), preferably about 1/16 to about ⅛ inch (about 1.6 to 3.2 mm). The steel fiber component will be present as from 1% to 12% by volume, preferably 1% to 9% by volume, of the composition.

The third component of the present composition is a carbonaceous component which is composed of carbon particles in any of a variety of forms, such as carbon black, carbon flour, graphite or ground anthracite. A single material such as carbon black or mixtures of the various carbon-containing materials may be used. This component will normally be present as from 5 to 30 volume percent, perferably 16 to 25 volume percent. Normally the particle size of the carbonaceous particles will be in the range from 0.02 to 150 microns.

A further component of the present composition will be inorganic fillers. These may be a wide variety of granulated inorganic materials which do not substantially affect the friction properties of the composition, but are rather used to fill out the composition and reduce the necessity for using more of the expensive organic component. In addition, they also provide thermal properties to some degree, in that they serve as heat sinks. Typical of the materials which may be used include alumina, barytes, silica, iron oxides, whiting, talc, diatomite, granulated rock wool, clay and the like as well as mixtures of these various materials. Particle sizes will normally be in the range of from 4 to 75 microns. The inorganic fillers will normally be present as from 5 to 35 percent by volume, preferably 15 to 30 percent by volume of the composition. It is particularly important that the inorganic filler component contains neither asbestos fiber nor lead metal or lead compounds (such as lead oxides, litharge, galena, etc.). Not only are these materials objectionable from an environmental point of view, but in addition it has been found that the lead materials are detrimental to brake performance.

The final materials required in the present invention are "additives" used to vulcanize, cure or otherwise modify the rubbers and resins in the organic component. These will naturally vary depending upon the nature of the particular organic component used, but in general will include materials such as sulphur, zinc oxide, thiazoles, sulfenamides, dithiocarbamates, peroxides, anti-oxidants, retarders and processing aids. A wide variety of such materials are described in the art including the above-mentioned *Vanderbilt Rubber Handbook*. The additives will be present as from about 1 to 7 volume percent, preferably 2 to 4 volume percent.

In addition, if desired, the composition may also contain either or both of two additional components: friction modifiers and/or cashew nut shell resin particles. Friction modifiers are those inorganic materials which substantially affect the friction properties of the material. For the purposes of this invention, it will be considered that such friction modifiers are commonly minerals or ceramics having a Mohs hardness of greater than 5. Typical of such materials are silicon carbide, zircon, garnet, iron chromite and similar materials. Also included among friction modifier materials is a material known as "metal grit" which is composed of granules of hard metal such as scrap cast iron. The presence of metal grit may be used to some extent for economic reasons to reduce the total amount of steel fiber needed. However, the volume percent of steel fiber required will be at least equal to one-half the volume percent of metal grit present, and preferably at least equal to the volume percent of the metal grit, since in the absence of steel fiber the brake materials tested did not meet wear rate and/or heavy grade testing standards. The friction modifiers will be in the form of granules having particle sizes in the range of from about 0.05 to 200 microns. The friction modifiers will be present as up to 15 volume percent, preferably 2 to 10 volume percent, of the composition.

The cashew nut shell resin particles are manufactured from fully cured condensation resins formed by polymerizing cashew nut shell oil with aldehydes. These resins are disclosed in the aforementioned U.S. Pat. Nos. 2,686,140 and 2,861,964. The cashew nut shell resin particles will be present as up to 20 volume percent, preferably from 2 to 8 volume percent, of the composition. Particle sizes will generally range from 0.1 to 2.0 mm.

The compositions of this invention may be molded into railroad brake shoes for tread brake and brake pads for disc brakes using a variety of molding techniques depending on the particular embodiment of the composition used. For high volume products it is preferred to use hot mixing such as a Banbury mixer and injection or compression molding. For such types of processing the viscosity of the formulation should not exceed 140 as measured by a Mooney viscometer using a large rotor and measured after four minutes operation at 212° F. Other compositions may be more readily mixed and molded using cold mixing techniques such as a Ross mixer. Some of these cold mixed materials may be molded by either injection molding or compression molding while some are suitable only for compression molding. The variations in composition which determine the most appropriate type of mixing and/or molding will be evident to those skilled in the art from the descriptions of the examples below. Description of various types of processing equipment including mixers and molds may be found in Stern, *Rubber: Natural and Synthetic* (2d edn., 1967) and Rubber World, *Machinery and Equipment for Rubber and Plastics* (2d edn., 1963).

The following are typical examples of brake compositions within the scope of this invention, with all components listed as percent by volume (total percentage for each type of component is listed to the left in each column, while the percentage for each individual material is listed to the right). In these examples the abbreviation "TBBTS" stands for N-tert-butyl-2-benzothiazolesulfenamide, the abbreviation "BTADS" stands for benzothiazyldisulfide, the "retarder" was a "prevulcanization retarder" commercially available under the trade name "PVI" from Monsanto Company, and the "processing aid" was a waxy material commercially available under the Trade name "Vanfre AP-2" from R. T. Vanderbilt Company. These examples illustrate intended service and processing as indicated in Table II below:

TABLE II

| Example | Intended Service | Type of Mixing | Type(s) of Molding |
|---------|------------------|----------------|---------------------|
| 1 | AAR | hot | injection, compression |
| 2 | AAR | cold | injection, compression |
| 3 | AAR | cold | compression |
| 4 | AAR | hot | injection, compression |
| 5 | AAR | cold | injection, compression |
| 6 | AAR | cold | compression |
| 7 | Heavy duty | cold | compression |
| 8 | Disc brake | cold | compression |

TABLE III

| Component | Example No. | 1 | 2 | 3 | 4 | 5 | 6 | 7 | 8 |
|-----------|-------------|---|---|---|---|---|---|---|---|
| Organic component | | 42.7 | 42.0 | 42.7 | 41.2 | 40.7 | 40.8 | 52.7 | 34.7 |
| SBR-1502 crumb rubber | | — | — | 39.7 | — | — | 39.3 | 31.4 | 28.3 |
| SBR-1506 rubber | | 39.7 | 39.1 | — | 39.7 | 39.2 | — | — | — |
| Phenolic resin | | 3.0 | 2.9 | 3.0 | 1.5 | 1.5 | 1.5 | 21.3 | 6.4 |
| Steel fiber (Grade No. 0) | | 1.3 | 1.3 | 1.3 | 1.3 | 1.3 | 1.3 | 3.1 | 7.4 |
| Carbonaceous component | | 21.9 | 21.5 | 21.9 | 22.6 | 22.3 | 22.3 | 17.2 | 17.9 |
| Carbon black | | 13.3 | 13.1 | 13.3 | 13.3 | 13.1 | 13.1 | 10.5 | 4.4 |
| Carbon flour | | 8.6 | 8.4 | 8.6 | — | — | — | 5.0 | 8.0 |
| Graphite | | — | — | — | 9.3 | 9.2 | 9.2 | 1.7 | — |
| Ground anthracite | | — | — | — | — | — | — | — | 5.5 |
| Inorganic fillers | | 20.0 | 21.2 | 21.5 | 23.1 | 24.2 | 24.4 | 17.3 | 27.5 |
| Aluminosilicate | | 10.8 | 10.6 | 10.8 | 10.8 | 10.6 | 10.7 | 8.5 | 23.5 |
| Clay | | 5.0 | 5.0 | 5.0 | 6.8 | 6.8 | 6.8 | 4.0 | — |
| Barytes | | 0.8 | 0.8 | 0.8 | 2.1 | 2.1 | 2.1 | 1.0 | 3.0 |
| Red iron oxide | | 3.4 | 3.4 | 3.4 | 3.4 | 3.3 | 3.3 | 2.7 | — |
| Talc | | — | 1.4 | 1.5 | — | 1.4 | 1.5 | 1.1 | 1.0 |
| Additives | | 3.2 | 3.2 | 1.7 | 2.7 | 2.6 | 2.2 | 2.4 | 3.1 |
| Sulfur | | 1.1 | 1.1 | 1.1 | 1.6 | 1.6 | 1.6 | 1.7 | 1.6 |
| TBBTS | | 0.3 | 0.3 | 0.3 | 0.3 | 0.3 | 0.3 | 0.2 | 0.2 |
| BTADS | | — | — | — | — | — | — | — | 0.1 |
| Stearic acid | | 0.2 | 0.2 | — | 0.2 | 0.2 | — | — | 0.2 |
| Zinc oxide | | 0.3 | 0.3 | 0.3 | 0.3 | 0.3 | 0.3 | 0.3 | 1.0 |
| Retarder | | 0.2 | 0.2 | — | 0.3 | 0.2 | — | 0.2 | — |
| Processing aid | | 1.1 | 1.1 | — | — | — | — | — | — |
| Friction modifiers | | 7.3 | 7.3 | 7.3 | 5.5 | 5.4 | 5.4 | 4.5 | 3.0 |
| Iron chromite | | 5.4 | 5.4 | 5.4 | 5.5 | 5.4 | 5.4 | 4.0 | 2.7 |
| Silicon carbide | | 0.6 | 0.6 | 0.6 | — | — | — | 0.5 | 0.3 |
| Metal Grit | | 1.3 | 1.3 | 1.3 | — | — | — | — | — |
| Cashew nut shell resin particles | | 3.6 | 3.5 | 3.6 | 3.6 | 3.5 | 3.6 | 2.8 | 6.4 |
| Rubber:resin volume ratio | | 13.2:1 | 13.5:1 | 13.2:1 | 26.5:1 | 26.1:1 | 26.2:1 | 1.5:1 | 4.4:1 |

Of the Examples above, the compositions of Examples 1, 2 and 3 are preferred as having the optimum properties for processing and giving highly satisfactory braking results. The compositions of Examples 4, 5 and 6 produced entirely adequate braking characteristics but had generally somewhat more variable performance than those of Examples 1, 2 and 3, as well as being generally noisier during application. The composition of Example 7 has been tested for locomotive service and found to give results equal to or better than conventional composition brake shoes containing lead and/or asbestos. The composition of Example 8, while shown here as a disc brake material, can also be used for some tread brake applications.

What is claimed is:

1. A friction material composition suitable for use as a brake shoe for railroad service
   (a) which comprises, in percent by volume:

| | |
   |---|---|
   | organic component | 30-60% |
   | steel fibers | 1-12% |
   | carbonaceous component | 5-30% |
   | inorganic fillers | 5-35% |
   | additives | 1-7% |

(b) which also contains no lead metal, lead compounds or asbestos fiber; and
   (c) wherein said organic component comprises rubber in an amount of at least 20% by volume of the composition.

2. A friction material composition as in claim 1 further comprising up to 15 percent by volume of friction modifiers.

3. A friction material composition as in claim 1 or 2 further comprising up to 20 percent by volume of cashew nut shell resin particles.

4. A friction material composition as in claim 1 wherein said steel fibers have diameters within the range designated as Grade No. 0 to Grade No. 3.

5. A friction material composition as in claim 4 wherein said steel fibers have lengths within the range of from about 1/32 to about 3/16 inch.

6. A friction material composition as in claim 1 wherein said organic component is present as 34 to 53 percent by volume.

7. A friction material composition as in claim 1 wherein said steel fibers are present as 1 to 9 percent by volume.

8. A friction material composition as in claim 1 wherein said carbonaceous component is present as 16 to 25 percent by volume.

9. A friction material composition as in claim 1 wherein said inorganic fillers are present as 15 to 30 percent by volume.

10. A friction material composition as in claim 1 wherein said organic component comprises a mixture of rubber and phenolic resin.

11. A friction material composition as in claim 10 wherein the rubber:resin volumetric ratio is at least 5.3:1.

12. A friction material composition as in claim 11 wherein said rubber:resin volumetric ratio is at least 10:1.

13. A friction material composition as in claim 1 wherein said rubber in said organic component is present as at least 35% by volume of the composition.

14. A friction material composition as in claim 1
    (a) comprising in percent by volume:

| | |
    |---|---|
    | organic component | 34-53% |
    | steel fibers | 1-9% |
    | carbonaceous component | 16-25% |
    | inorganic fillers | 15-30% |
    | additives | 2-4% |

(b) which also contains no lead metal, lead compounds or asbestos fiber; and
    (c) wherein said organic component comprises rubber in an amount of at least 20% by volume of the composition.

15. A friction material composition as in claim 14 further comprising 2 to 10 percent by volume of friction modifiers.

16. A friction material composition as in claim 14 or 15 further comprising 2 to 8 percent by volume of cashew nut shell resin particles.

17. A friction material composition as in claim 14 wherein said steel fibers have diameters within the range designated as Grade No. 0 to Grade No. 1.

18. A friction material composition as in claim 17 wherein said steel fibers have lengths within the range of from about 1/16 to about ⅛ inch.

19. A friction material composition as in claim 14 wherein said organic component comprises a mixture of rubber and phenolic resin.

20. A friction material composition as in claim 19 wherein the rubber:resin volumetric ratio is at least 5.3:1.

21. A friction material composition as in claim 20 wherein said rubber:resin volumetric ratio is at least 10:1.

22. A friction material composition as in claim 14 wherein said rubber in said organic component is present as at least 35% by volume of the composition.

23. A railroad disc brake shoe composed of the composition of claim 1.

24. A railroad tread brake shoe composed of the composition of claim 1.

25. A railroad disc brake shoe composed of the composition of claim 14.

26. A railroad tread brake shoe composed of the composition of claim 14.

27. A friction material composition as in claim 16 consisting essentially of, in percent by weight:

| | |
    |---|---|
    | organic component | 42.7% |
    | steel fiber | 1.3% |
    | carbonaceous component | 21.9% |
    | inorganic fillers | 20.2% |
    | additives | 3.2% |
    | friction modifiers | 7.3% |
    | cashew nut shell resin particles | 3.6% |

28. A friction material composition as in claim 16 consisting essentially of, in percent by weight:

| | |
    |---|---|
    | organic component | 42.0% |
    | steel fiber | 1.3% |
    | carbonaceous component | 21.5% |
    | inorganic fillers | 21.2% |
    | additives | 3.2% |
    | friction modifiers | 7.3% |
    | cashew nut shell resin particles | 3.5% |

29. A friction material composition as in claim 16 consisting essentially of, in percent by weight:

| | |
    |---|---|
    | organic component | 42.7% |
    | steel fiber | 1.3% |
    | carbonaceous component | 21.9% |
    | inorganic fillers | 21.5% |
    | additives | 1.7% |
    | friction modifiers | 7.3% |
    | cashew nut shell resin | |

-continued

| particles | 3.6% |

30. A friction material composition as in claim 16 consisting essentially of, in percent by weight:

| organic component | 52.7% |
| steel fiber | 3.1% |
| carbonaceous component | 17.2% |
| inorganic fillers | 17.3% |
| additives | 2.4% |
| friction modifiers | 4.5% |
| cashew nut shell resin particles | 2.8% |

31. A friction material composition as in claim 16 consisting essentially of, in percent by weight:

| organic component | 34.7% |
| steel fiber | 7.4% |
| carbonaceous component | 17.9% |
| inorganic fillers | 27.5% |
| additives | 3.1% |
| friction modifiers | 3.0% |
| cashew nut shell resin particles | 6.4% |

32. A railroad tread brake composed of the composition of claim 27.

33. A railroad tread brake composed of the composition of claim 28.

34. A railroad tread brake composed of the composition of claim 29.

35. A railroad tread brake composed of the composition of claim 30.

36. A railroad disc brake composed of the composition of claim 31.

* * * * *

UNITED STATES PATENT AND TRADEMARK OFFICE
CERTIFICATE OF CORRECTION

PATENT NO. : 4,178,278
DATED : December 11, 1979
INVENTOR(S) : Harold J. Reynolds, Jr.

It is certified that error appears in the above-identified patent and that said Letters Patent are hereby corrected as shown below:

On the cover page, under the heading "FOREIGN PATENT DOCUMENTS", the reference "53,572 10/1970 Australia" should read --433433 10/1970 Australia--.

Signed and Sealed this

Sixteenth Day of September 1980

[SEAL]

Attest:

SIDNEY A. DIAMOND

Attesting Officer

Commissioner of Patents and Trademarks